April 28, 1970     H. V. HICKS ET AL     3,508,973
REMOTE INDICATION OF THE SPECIFIC GRAVITY OF BATTERY ELECTROLYTE
Filed Feb. 14, 1968
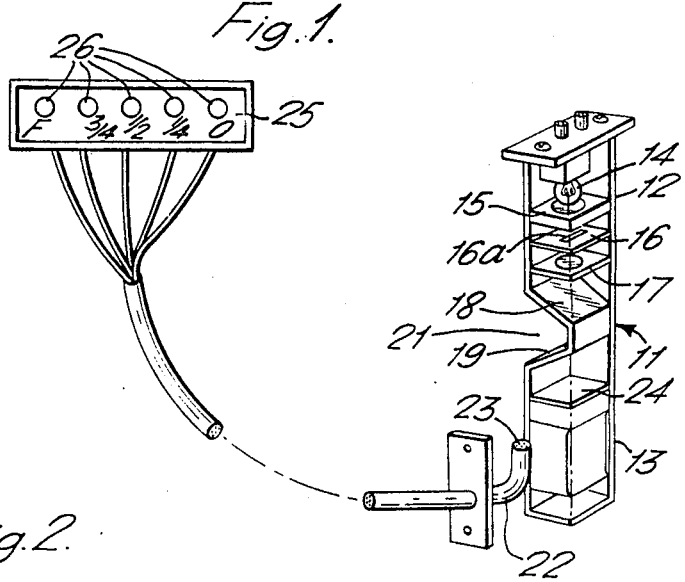
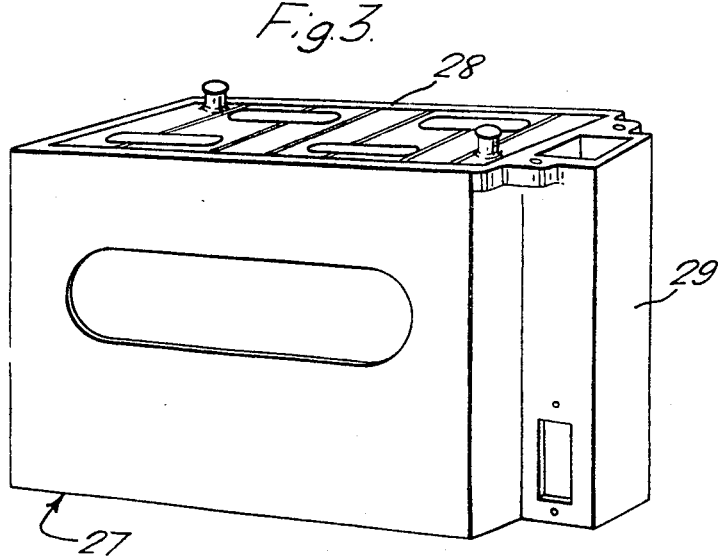
INVENTOR
Harris Vernon Hicks
Kenneth James Jones
BY Hancock, Downing & ......
ATTORNEYS United States Patent Office 3,508,973
Patented Apr. 28, 1970

3,508,973
REMOTE INDICATION OF THE SPECIFIC
GRAVITY OF BATTERY ELECTROLYTE
Harris Vernon Hicks, Lichfield, and Kenneth James Jones,
Sutton Coldfield, England, assignors to Joseph Lucas
(Industries) Limited, Birmingham, England, a British
company
Filed Feb. 14, 1968, Ser. No. 705,414
Claims priority, application Great Britain, Mar. 6, 1967,
10,420/67
Int. Cl. H01m 31/04
U.S. Cl. 136—182                                  4 Claims

ABSTRACT OF THE DISCLOSURE

The specific gravity of a liquid is indicated at a remote point by using a light projector to pass a beam of light through a sample of the liquid, the beam impinging on a receiver including a plurality of optical cables. The optical cable which is illuminated depends on the specific gravity of the liquid, and the other ends of the optical cables are arranged so as to indicate the specific gravity. The invention is particularly useful for indicating the state of charge of a battery.

---

This invention relates to the remote indication of the specific gravity of a liquid especially electrolyte in a battery.

The invention resides in apparatus for indicating the specific gravity of a liquid at a remote point, comprising a light projector for projecting a beam of light through a sample of liquid, and a receiver on which said beam impinges after passing through the sample of liquid, the receiver including a plurality of optical cables, one end of each cable respectively being positioned so that said beam can impinge thereon while the other end of each cable respectively is positioned remote from the sample of liquid, the arrangement being such that in use as the specific gravity of the sample of liquid changes the angle through which said beam is refracted by the sample will change and the beam will traverse said one end of the optical cables, so that their other ends are illuminated in turn.

The invention is particularly useful where the liquid is the electrolyte of a lead-acid storage battery, the apparatus then indicating the state of charge of the battery.

The term optical cable is used herein to indicate a cable consisting of one or more fibres and which will transmit light from its one end to its other end irrespective of the attitude of the cable.

In the accompanying drawings FIGURE 1 is a perspective view of an apparatus for indicating a change in specific gravity of a liquid according to one example of the invention, FIGURE 2 is a plan view of part of the receiver shown in FIGURE 1 and FIGURE 3 is a perspective view of a battery within which the apparatus shown in FIGURE 1 can be utilized.

Referring first to FIGURES 1 and 2 there is provided a two part casing 11 housing in its upper part a light projector 12 and in its lower part a light receiver 13. The projector 12 includes a lamp 14 and a condenser lens 15, a slotted plate 16 and a further lens 17. The condenser lens 15 directs a beam of light from the lamp 14 onto the slotted plate 16 and the lens 17 projects an image of the slot 16a in the plate 16 towards the receiver 13. The casing 11 includes a pair of plane transparent walls 18, 19 which are positioned between the projector and the receiver. The walls 18, 19 are inclined toward one another so as to define between them a wedge shaped gap 21 which in use contains a sample of the test liquid.

The receiver 13 includes one end of an arrangement of optical cables 22 the ends 23 of which are spaced in the direction in which a beam of light from the projector will be moved as the refractive index of a sample of liquid in the gap 21 changes. In use the sample acts as a prism and the light from the lamp 14 passing through the sample is dispersed into a plurality of beams of its spectral colours. A filter 24 is placed between the ends of the cables 22 and the gap 21 so that only the red light from the lamp 14 impinges on the ends 23.

The cables 22 extend from the receiver 13 to an indicator 25, where the other ends 26 of the respective cables 22 are arranged in a sequence corresponding to the sequence in which the ends 23 are impinged upon by the beam of light from the projector 12, as the refractive index of the sample of liquid in the gap 21 changes.

Referring now to FIGURE 3, there is provided an electric storage battery 27 the casing 28 of which includes a part 29 within which the apparatus is accommodated. The part 29 communicates with the adjacent cell of the battery so that in use electrolyte from the cell fills the gap 21 of the apparatus.

As the cell discharges in use, the specific gravity of the electrolyte in the cell and in the gap 21 decreases and an indication of this change is displayed on the indicator 25. Thus, there is a visible indication of the state of charge of the particular cell of the battery and in practice such an indication is adequate for indicating the charge of the entire battery. Apparatus of the sort could for example be utilized in electrically powered vehicles wherein the indicator 25 would perform the same function as a fuel gauge.

Having thus described our invention what we claim as new and desire to secure by Letters Patent is:

1. An electric storage battery having a casing and containing electrolyte the improvement consisting of a means in the battery casing, said means including a light projector for projecting a beam of light through a portion of the electrolyte; and a receiver on which said light beam impinges after traversing said electrolyte portion, said receiver including a plurality of optical cables one end of each being spaced in said receiver to selectively be illuminated by said light beam and the other end of each being arranged in an indicator remote from said battery, such that a change in the specific gravity of said electrolyte will change the refractive index thereof and consequently change the particular optical cable being primarily illuminated.

2. An electric storage battery as claimed in claim 1 further including a wedge shaped compartment in one of the cells of said battery, said compartment being filled with electrolyte and having transparent walls through which said light beam penetrates.

3. An electric storage battery as claimed in claim 1 wherein said receiver further includes a light filter which permits refracted light of only one color to illuminate said optical cables.

4. An electric storage battery as claimed in claim 3 wherein said one color is red.

References Cited

UNITED STATES PATENTS

| 2,483,102 | 9/1949 | Pierson | 356—134 |
|---|---|---|---|
| 3,090,222 | 5/1963 | Akaboshi et al. | 356—134 |
| 3,272,174 | 9/1966 | Pribonic | 340—380 |

WINSTON A. DOUGLAS, Primary Examiner

D. L. WALTON, Assistant Examiner

U.S. Cl. X.R.

73—32; 340—236, 249